US005294500A

United States Patent [19]

Miyata et al.

[11] Patent Number: 5,294,500

[45] Date of Patent: Mar. 15, 1994

[54] LEAD ACID STORAGE BATTERY

[75] Inventors: Koji Miyata; Toshiaki Hosoya, both of Imaichi, Japan

[73] Assignee: Furukawa Denchi Kabushiki Kaisha, Yokohama, Japan

[21] Appl. No.: 977,711

[22] Filed: Nov. 17, 1992

[30] Foreign Application Priority Data

Nov. 22, 1991 [JP] Japan ............................ 3-111382[U]

[51] Int. Cl.$^5$ ........................ H01M 4/73; H01M 2/36

[52] U.S. Cl. .................................... 429/186; 429/237; 429/130

[58] Field of Search ........................ 429/186, 237, 130

[56] References Cited

U.S. PATENT DOCUMENTS 4,121,019 10/1978 Garrett, Jr. ........................ 429/186

4,939,047 7/1990 Nagoshima ........................ 429/186

OTHER PUBLICATIONS

Kokai Utility Model Publication No. Hei 2 (1990)-39459 (with English language translation) (1990).

*Primary Examiner*—David B. Springer

*Attorney, Agent, or Firm*—Armstrong, Westerman, Hattori, McLeland & Naughton

[57] ABSTRACT

A lead acid storage battery comprising a battery container, a plate assembly assembled by stacking a negative electrode plate and a positive electrode plate one upon another through a separator interposed between the negative and positive electrode plates, and a saddle placed on the bottom surface of the battery container for absorbing the extension of the positive electrode plate. Legs of a negative electrode grid plate consisting of the negative electrode plate are larger in width than legs of a positive electrode grid plate consisting of the positive electrode plate.

5 Claims, 2 Drawing Sheets

LEAD ACID STORAGE BATTERY

1. FIELD OF THE INVENTION

This invention relates to a lead acid storage battery.

2. BACKGROUND

Grid plates for making positive and negative electrode plates of a conventional lead acid storage battery are made of Pb-Ca-Sn alloy or other like alloy. With such a conventional storage battery, both the positive and negative electrode grid plates carry legs formed to be of an equal width. There has been known a lead acid storage battery carrying plate assembly of positive and negative electrode plates made out of the grid plates fabricated as mentioned above, in which said plate assembly is placed in a battery container in such a manner that the negative and positive electrode plates may be rested on and supported by such a saddle disposed at the bottom surface of the battery container that is capable of absorbing the extension of the positive electrode plates.

However, it has been observed with the conventional storage battery that when it is in use, there occurs the extension of the positive electrode plate in particular and this positive electrode plate extension can only be absorbed unsatisfactorily by the saddle, thus causing warping of the positive electrode plate and other inconveniences which result in the internal shortcircuiting in the negative and positive electrode plates of the plate assembly. More specifically, the warped positive electrode plates cause shortcircuiting with the adjoining negative electrode plates, leading to the decreased capacity and shorter service life of the battery. This kind of the disadvantageous phenomenon takes place at an even more accelerated pace when the battery is used under a high temperature condition.

As a means of solving these problems, the saddles made of various expandable resin materials having different expansion ratios have been used in the storage batteries only to see the problems still remain unsolved. In view of the above, it is much desired to make available a means that can help improve the absorption effect with respect to the positive electrode extension.

SUMMARY OF THE INVENTION

The object of the present invention is to provide a lead acid storage battery that uses negative and positive electrode grid plates designed to get rid of the above mentioned defects and satisfy the above noted objective.

The lead acid storage battery according to the present invention is characterized in that it comprises a plurality of negative and positive grid plates assembled together into a plate assembly provided with a separator between negative and positive electrodes, said grid plates having legs wherein the legs of the negative electrode grid plate are larger in width than the legs of the positive electrode grid plate; and a battery container for holding the plate assembly, said container being provided with a saddle for mounting and supporting the legs of the grid plates in a manner to absorb an extension of the positive electrode plates.

DETAILED DESCRIPTION OF THE INVENTION

In the following, an embodying example of the present invention will be described with reference to the accompanying drawings.

Figure 1:
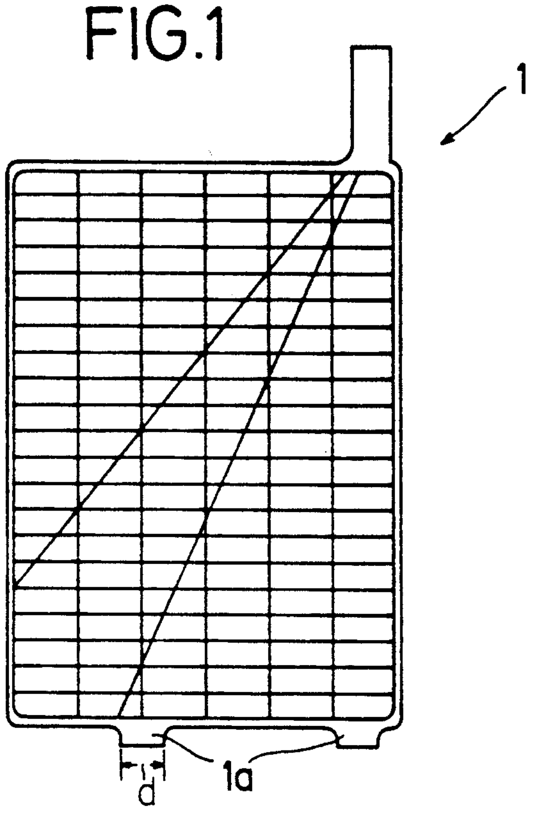
FIG. 1 is a front view of the negative electrode grid plate for a lead acid storage battery according to one embodiment of the present invention.
Figure 2:
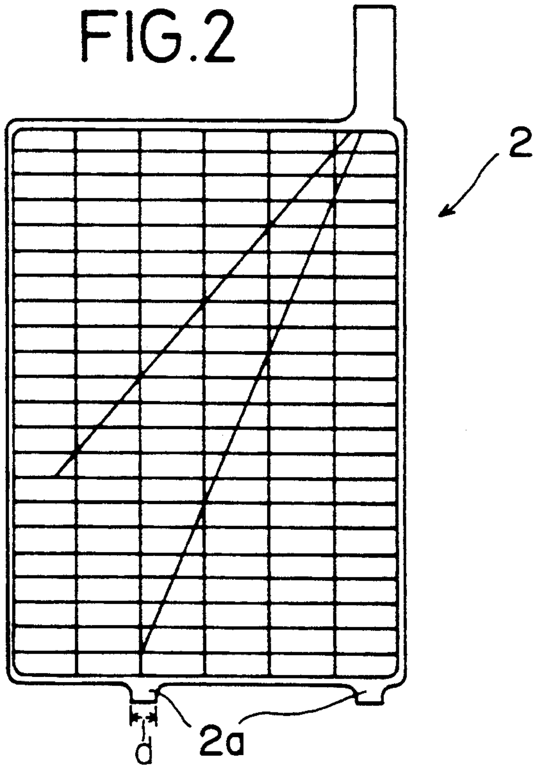
FIG. 2 is a front view of the positive electrode grid plate for a lead acid storage battery according to the embodiment of the present invention.

FIG. 1 shows a negative electrode grid plate 1 used for a lead acid storage battery according to the present invention. FIG. 2 shows a positive electrode grid plate 2 also used for the lead acid storage battery according to the invention. Both the negative and positive electrode grid plates 1 and 2 are cast from a suitable alloy material such as, for example, one composed of Pb, Ca and Sn in a proper composition ratio, by a known casting process. According to the present invention, the negative and positive grid plates are so made that the negative electrode grid plate may have a leg 1*a* having a larger width than a leg 2*a* of the positive electrode grid plate 2. In the illustrated examples, the width d of the leg 1*a* of the negative electrode grid plate 1 is set at 10 mm, whereas the width d of the leg 2*a* of the positive grid plate 2 is set at 6 mm. The legs 1*a* and 2*a* of the negative and positive electrode grid plates 1 and 2 have the same height, for instance, 4 mm. It is general with respect to the design of a lead acid storage battery that the negative electrode grid plate 1 is made thinner in thickness than the positive electrode grid plate. Therefore, in accordance with this general practice, in the illustrated examples, thickness of the positive electrode grid plate 2 was made 1.4 mm and that of the negative electrode grid plate was made 1.3 mm. As a result, the sectional area of the leg 2*a* of the positive electrode grid plate 2 is 0.084 $cm^2$ whereas that of the leg 1*a* of the negative electrode grid plate 1 is 0.13 $cm^2$, thereby making the sectional area of the leg 1*a* of the negative electrode grid plate 1 about 1.5 times larger than that of the leg 2*a* of the positive electrode grid plate 2.

The electrode grid plates 1, 2 thus made as above were filled respectively with appropriate positive and negative active materials, coated and formed into a plurality of the positive and negative electrode plates by means of a generally known method.

For comparison, a plurality of the conventional positive electrode grid plates and negative electrode grid plates were made by casting. More specifically, these positive and negative electrode grid plates were manufactured respectively in two groups, those with the leg width 10 mm in one group and those with that of 6 mm in the other group. Other dimensional specifications for them were the same as those for the positive electrode grid plate 2 and the negative electrode grid plate 1 given in the above mentioned embodying examples of the present invention. To be more specific, they included 1.4 mm for the thickness of the positive electrode grid plate and 1.3 mm for that of the negative electrode grid plate. The two groups or types of the positive and negative electrode grid plates thus manufactured in the above mentioned manner for comparison use were filled and coated with the positive and negative active materials, respectively, to make positive and negative electrode plates for comparison use.

Six (6) units of the positive electrode consisting of said positive electrode grid plate and seven (7) units of the negative electrode plate consisting of said negative electrode grid plate, all of which were manufactured as described in the foregoing according to the present invention, were assembled together with a separator placed between each mutually adjacent negative and positive electrode plate in accordance with a generally known method to produce a plate assembly thereof. This plate assembly was put into a battery container and was rested on an expanded or foam synthetic resin made saddle with the expansion ratio of 50 attached to the bottom of the container said plate assembly being plated therein in such a manner that the legs of each component electrode plate of the plate assembly may be rested on the saddle and supported thereby. In this way, a sealed lead acid storage battery of the present invention was manufactured.

The foam synthetic resin made saddle may be a polystyrene foam, a polyurethane foam, polyethylene foam or the like.

Figure 3:
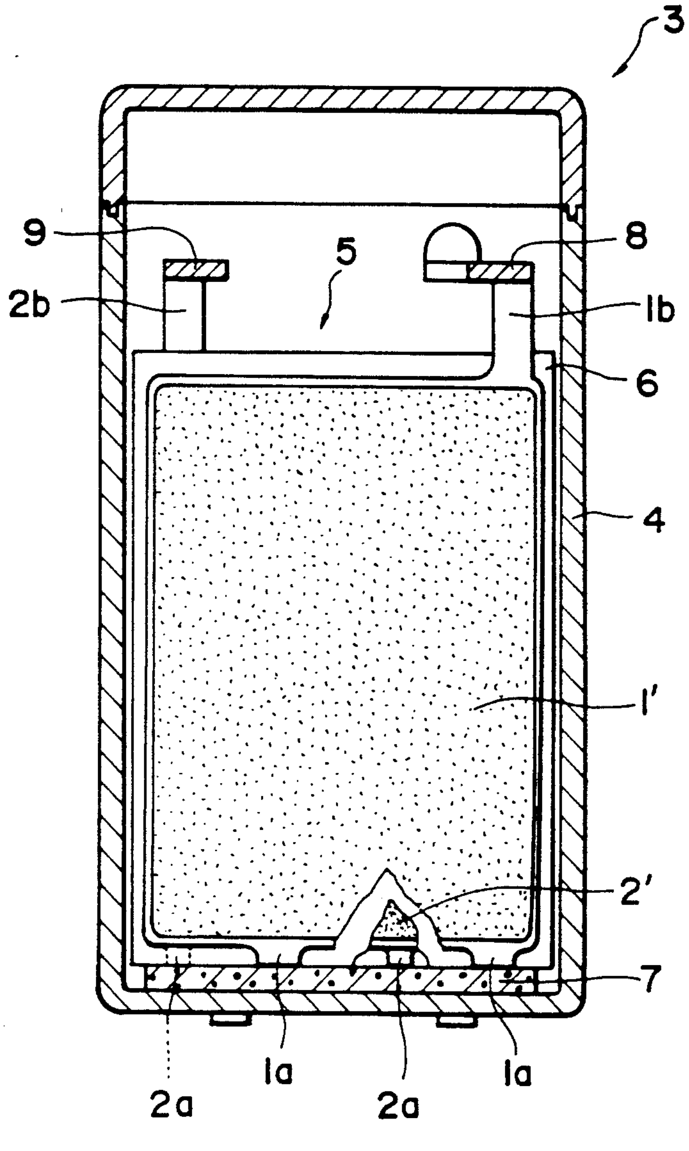
FIG. 3 is a sectional view, partly omitted, of one embodying example of a lead acid storage battery according to the present invention.

FIG. 3 shows a sealed lead acid storage battery produced as above. In this Figure, numeral 3 denotes such a battery, numeral 4 denotes a battery container, numeral 5 denotes a plate assembly comprising a negative electrode plate 1', a positive electrode plate 2' and a separator 6 interposed between the negative and positive electrodes 1' and 2'. Numeral 7 denotes a saddle in the shape of a rectangle covering the whole area of the bottom surface of the container 4. In the illustrated example, the thickness or height of the saddle 7 is 6 mm, but is not limited to this thickness. In general, the thickness of the saddle 7 is in 1.2 times to twice that of the height of the leg of each of the negative and positive electrode grid plates 1 and 2. Further, in the drawing, numeral 8 denotes a negative strap interconnecting lined-up negative lugs **1*b* and numeral 9 denotes a positive strap interconnecting lined-up positive lugs 2*b***.

In the illustrated example, the four legs **1*a*,1*a*,2*a*,2*a* of the negative and positive electrodes disposed in the widthwise direction of the plate assembly 5 were mounted on a single common sheet-formed saddle 7. The thickness of the saddle 7** may be properly set as desired according to the kind thereof and/or the weight of the plate assembly, etc.

The types, A and B, of the conventional comparative-use lead acid storage batteries were manufactured in a similar manner in which positive and negative electrode plates consisting of one type or the other of the above mentioned two types of electrode grid plates were assembled into respective plate assemblies, each of said assemblies being placed in a battery container of the above-described construction so as to be mounted on and supported by the saddle which was the same as above.

Accelerated life tests were carried out on the lead acid storage battery of the present invention and on said two types of the lead acid storage batteries A and B for comparison. The tests continued for 10 months under temperature of 50° C. and charging voltage of 2.2 V/cell. After the ten months, these batteries were disassembled and their extension absorption effects were investigated.

The sinkage into the saddle of the positive electrode grid plate and that of the negative electrode grid plate were both measured to determine the absorption effect represented by a difference between the sinkage of the positive and the negative plates. The results thus obtained as shown in Table 1.

TABLE 1

| | Width of Grid Plate's Leg (mm) | | Sect'l Area Ratio of Grid Plate's Legs Negative/Positive | Disassembled and Investigated After 10 Months | | |
|---|---|---|---|---|---|---|
| | Positive | Negative | | Sinkage of Pos. Elect. Grid Plate | Sinkage of Neg. Elect. Grid Plate | Absorption Effect |
| Comparative-Use Battery A | 10 | 10 | 0.93 | Approx. 2 mm | Approx. 0.3 mm | 1.7 mm |
| Comparative-Use Battery B | 6 | 6 | 0.93 | Approx. 4 mm | Approx. 1.8 mm | 2.2 mm |
| Battery of Present Invention | 6 | 10 | 1.55 | Approx. 4 mm | Approx. 0.3 mm | 3.7 mm |

The negative electrode plate of each of the plate assemblies in the comparative-use battery A, comparative-use battery B and the battery of the present invention never having been extended in ten months, and the respective sinkage values approx. 0.3 mm, approx. 1.8 mm and approx. 0.3 mm of the negative electrode grid plates were caused by resting and supporting the respective plate assemblies on the respective saddles. Therefore, those respective sinkage values are equal to those of the respective positive electrode grid plates of the above three kinds of batteries caused by resting and supporting of the respective plate assemblies on the respective saddles. Therefore, the absorption effect 1.7 mm of the battery A is obtained by subtracting 0.3 mm from 2 mm for the comparative-use battery A, the absorption effect 2.2 mm is obtained by subtracting 1.8 mm from 4 mm for the comparative-use battery B, and the absorption effect 3.7 mm is obtained by subtracting 0.3 mm from 4 mm for the battery of the present invention.

As clear from the above-cited Table 1, it has been confirmed that the storage battery of the present invention in which the leg **1*a* of the negative electrode grid plate 1 was made larger in width than the leg 2*a* of the positive electrode grid plate 2** as discussed above gives a notably greater absorption effect with respect to absorbing or, more specifically, making the saddle absorb to a greater degree an extension of the positive electrode plate thanks to the wider leg of the negative electrode plate, as compared with the conventional type storage batteries having the legs of the same width for both the positive and negative electrode plates. It is preferable in general that the width of the leg of the positive plate is selected from the range of 4 mm to 8 mm, and that of the leg of the negative plate is selected from the range of 8 mm to 16 mm.

As for the saddle, the thickness thereof may be selected properly according to the size of the electrode plate and the size of the legs of the electrode. In the above embodiment, the square sheet saddle was so wide that all of the legs of the negative and positive plates can be mounted thereon. In place of the square sheet-shaped saddle, a rod or belt-like one square in section but so narrow in width that only one leg of each of the negative and positive electrode plates can be mounted thereon may be used. In this case, four (4) units of the rod-like saddles are placed on the bottom surface of the battery container and the legs 1*a*, 1*a* of the negative electrode plate and the legs of 2*a*, 2*a* of the positive electrode plate 2 are mounted thereon individually.

As described in the foregoing, when a lead acid battery is, as proposed in the present invention, constructed to comprise a plate assembly of negative and positive electrode plates through a separator between each adjacent negative and positive electrode plates, said negative electrode plate consisting of a negative electrode grid plate having legs larger in width as compared with the positive electrode plate consisting of a positive electrode grid plate provided with similar legs and said plate assembly being put into a storage battery container and positioned therein in such a fashion that each electrode plate may have its legs mounted on such a saddle that is capable of absorbing the extension of the positive electrode, the extension absorption effect with respect to the positive electrode plate extension is much increased due to the fact that the width of the leg of the negative electrode plate is larger than that of the leg of the positive electrode plate, so that the internal shortcircuiting in the plate assembly resulting from the positive electrode plate extension can be prevented and the service life of the battery can be prolonged.

What is claimed:

1. A lead acid storage battery, comprising:

a plurality of negative and positive grid plates assembled together into a plate assembly provided with a separator between negative and positive electrodes, said grid plates having legs wherein the legs of the negative electrode grid plate are larger in width than the legs of the positive electrode grid plate; and a battery container for holding the plate assembly, said container being provided with a saddle for mounting and supporting the legs of the grid plates in a manner to absorb an extension of the positive electrode plates.

2. A lead acid storage battery as claimed in claim 1, wherein the width of the leg of the positive plate ranges from 4 mm to 8 mm, and that of the leg of the negative plate ranges from 8 mm to 16 mm.

3. A lead acid storage battery as claimed in claim 1, wherein the saddle comprises foam plastic.

4. A lead acid storage battery as claimed in claim 3, wherein the saddle comprises a sheet or mat covering a whole area of a bottom surface of the battery container.

5. A lead acid storage battery as claimed in claim 3, wherein the saddle comprises a rod which is square in section.

* * * * *